(12) United States Patent
Luo

(10) Patent No.: US 12,361,521 B2
(45) Date of Patent: Jul. 15, 2025

(54) IMAGE PROCESSING METHOD, IMAGING PROCESSING APPARATUS, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventor: Jun Luo, Kanagawa (JP)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 170 days.

(21) Appl. No.: 18/493,934

(22) Filed: Oct. 25, 2023

(65) Prior Publication Data
US 2024/0054613 A1    Feb. 15, 2024

Related U.S. Application Data

(63) Continuation of application No. PCT/CN2021/089704, filed on Apr. 25, 2021.

(51) Int. Cl.
*G06T 5/50*    (2006.01)
*G06T 3/40*    (2006.01)
(Continued)

(52) U.S. Cl.
CPC .............. *G06T 5/50* (2013.01); *G06T 3/40* (2013.01); *G06T 5/20* (2013.01); *G06V 10/242* (2022.01);
(Continued)

(58) Field of Classification Search
None
See application file for complete search history.

(56) References Cited

U.S. PATENT DOCUMENTS

| | | | |
|---|---|---|---|
| 2010/0026839 A1* | 2/2010 | Border | G06T 3/4053 348/222.1 |
| 2015/0244923 A1* | 8/2015 | Lee | H04N 25/583 348/234 |

(Continued)

FOREIGN PATENT DOCUMENTS

| | | |
|---|---|---|
| CN | 104915940 A | 9/2015 |
| CN | 108288253 A | 7/2018 |

(Continued)

OTHER PUBLICATIONS

International Search Report and Written Opinion for International Application No. PCT/CN2021/089704, mailed Dec. 9, 2021 (14 pages).

*Primary Examiner* — Sultana M Zalalee
(74) *Attorney, Agent, or Firm* — Ladas & Parry LLP

(57) ABSTRACT

An image processing method is provided. The method includes obtaining (S11) a plurality of first pixel images and a plurality of second pixel images by acquiring image data of an image sensor based on a preset image reading mode; obtaining (S12) a first processed pixel image, an aligning model, and a fusing parameter by aligning and fusing the first pixel images; obtaining (S13) a second processed pixel image by processing the second pixel images based on the aligning model and the fusing parameter respectively; and obtaining (S14) a target image by synthesizing the first processed pixel image and the second processed pixel image. Also disclosed are an image processing apparatus 10, an electronic device 100, and a computer readable storage medium.

20 Claims, 7 Drawing Sheets

(51) Int. Cl.
 *G06T 5/20* (2006.01)
 *G06V 10/24* (2022.01)
 *G06V 10/75* (2022.01)

(52) U.S. Cl.
 CPC .. *G06V 10/751* (2022.01); *G06T 2207/10024* (2013.01); *G06T 2207/20032* (2013.01); *G06T 2207/20221* (2013.01)

(56) References Cited

U.S. PATENT DOCUMENTS

2019/0253644 A1* 8/2019 Zhu .................. H04N 23/74
2020/0302582 A1   9/2020 Smirnov et al.
2022/0053150 A1* 2/2022 Jeong ................ H04N 25/41

FOREIGN PATENT DOCUMENTS

| CN | 109584179 A | 4/2019 |
| CN | 110650295 A | 1/2020 |
| CN | 111275653 A | 6/2020 |

* cited by examiner

IMAGE PROCESSING METHOD, IMAGING PROCESSING APPARATUS, ELECTRONIC DEVICE, AND STORAGE MEDIUM

CROSS REFERENCE TO RELATED APPLICATIONS

The present application is a continuation of International Patent Application No. PCT/CN2021/089704, filed on Apr. 25, 2021, the entire contents of which is herein incorporated by reference in its entireties.

TECHNICAL FIELD

The present disclosure relates to an image processing technology, in particular to an image processing method, an image processing apparatus, an electronic device, and a computer-readable storage medium.

BACKGROUND

A mobile terminal such as a mobile phone is usually equipped with an image sensor to realize a photographing function. In the related art, multiple channels may be used to read image data of the image sensor to better process the image data, so as to improve the image quality of the image sensor. However, the reading design of the existing image sensor is too complex, and fusing image data of the multiple channels into an image may cause image artifacts, which results in poor image quality of a generated image.

SUMMARY

The purpose of the present disclosure is to provide an image processing method, an image processing apparatus, an electronic device, and a computer-readable storage medium.

The image processing method according to some embodiments of the present disclosure includes: obtaining a plurality of first pixel images and a plurality of second pixel images by acquiring image data of an image sensor based on a preset image reading mode; obtaining a first processed pixel image, an aligning model, and a fusing parameter by aligning and fusing the first pixel images; obtaining a second processed pixel image by processing the second pixel images based on the aligning model and the fusing parameter respectively; and obtaining a target image by synthesizing the first processed pixel image and the second processed pixel image.

The electronic device according to some embodiments of the present disclosure includes an image sensor, a processor, a memory, and one or more programs. The one or more programs are stored in the memory and executed by the processor, and the one or more programs includes instructions that are configured to execute the image processing method which includes: obtaining a plurality of first pixel images and a plurality of second pixel images by acquiring image data of an image sensor based on a preset image reading mode; obtaining a first processed pixel image, an aligning model, and a fusing parameter by aligning and fusing the first pixel images; obtaining a second processed pixel image by processing the second pixel images based on the aligning model and the fusing parameter respectively; and obtaining a target image by synthesizing the first processed pixel image and the second processed pixel image.

The non-transitory computer-readable storage medium according to some embodiments of the present disclosure includes a computer program. In response to being executed by one or more processors, the computer program enables the one or more processors to execute the image processing method which includes: obtaining a plurality of first pixel images and a plurality of second pixel images by acquiring image data of an image sensor based on a preset image reading mode; obtaining a first processed pixel image, an aligning model, and a fusing parameter by aligning and fusing the first pixel images; obtaining a second processed pixel image by processing the second pixel images based on the aligning model and the fusing parameter respectively; and obtaining a target image by synthesizing the first processed pixel image and the second processed pixel image.

BRIEF DESCRIPTION OF THE DRAWINGS

The aforementioned and/or additional aspects and advantages of the present disclosure will become apparent and be easily understood according to description of embodiments in combination with accompanying figures.

Figure 1:
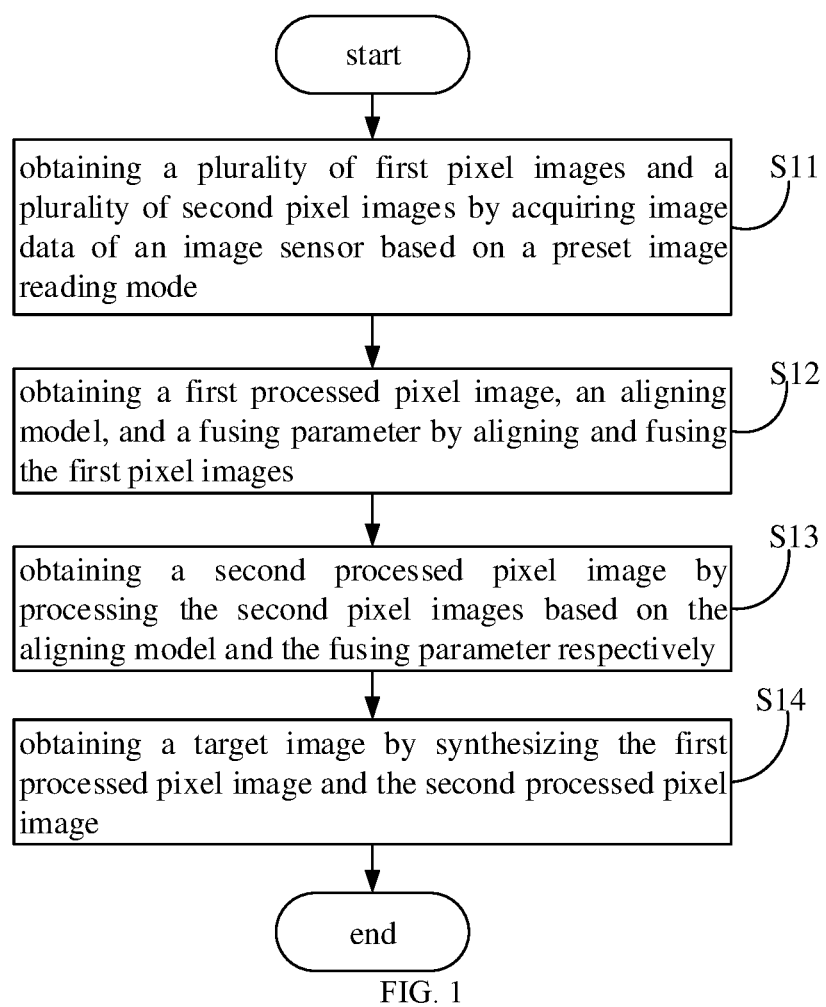
FIG. 1 is a schematic flow chart of an image processing method according to some embodiments of the present disclosure.

Symbols of main elements are illustrated as follows:

Electronic device 100, image processing apparatus 10, preprocessing module 11, first multi-frame processing module 12, aligning unit 122, first fusing unit 124, second multi-frame processing module 13, second fusing unit 132, synthesizing module 14;

Processor 20;

Image sensor 30, pixel array 301, vertical drive unit 302, control unit 303, column processing unit 304, horizontal drive unit 305;

Memory 40, program 42, computer-readable storage medium 50.

DETAILED DESCRIPTIONS

Embodiments of the present disclosure will be described in detail and examples of the embodiments are illustrated in the figures. The same or similar elements and the elements having the same or similar functions are denoted by the same or similar reference numbers throughout the description. Embodiments described herein with reference to the figures are exemplary, only serve to explain the present disclosure, and cannot be understood as limiting embodiments of the present disclosure.

As shown in FIG. 1, some embodiments of the present disclosure provide an image processing method, the image processing method includes the following blocks.

S11, the method includes acquiring image data of an image sensor based on or by using a preset image reading mode to obtain a plurality of first pixel images and a plurality of second pixel images (that is, the method includes obtaining a plurality of first pixel images and a plurality of second pixel images by acquiring image data of an image sensor based on a preset image reading mode).

S12, the method includes aligning and fusing the first pixel images to obtain a first processed pixel image, an aligning model, and a fusing parameter (that is, the method includes obtaining a first processed pixel image, an aligning model, and a fusing parameter by aligning and fusing the first pixel images).

S13, the method includes processing the second pixel images based on the aligning model and the fusing parameter respectively to obtain a second processed pixel image ((that is, the method includes obtaining a second processed pixel image by processing the second pixel images based on the aligning model and the fusing parameter respectively).

S14, the method includes synthesizing the first processed pixel image and the second processed pixel image to obtain a target image (that is, the method includes obtaining a target image by synthesizing the first processed pixel image and the second processed pixel image).

Figure 2:
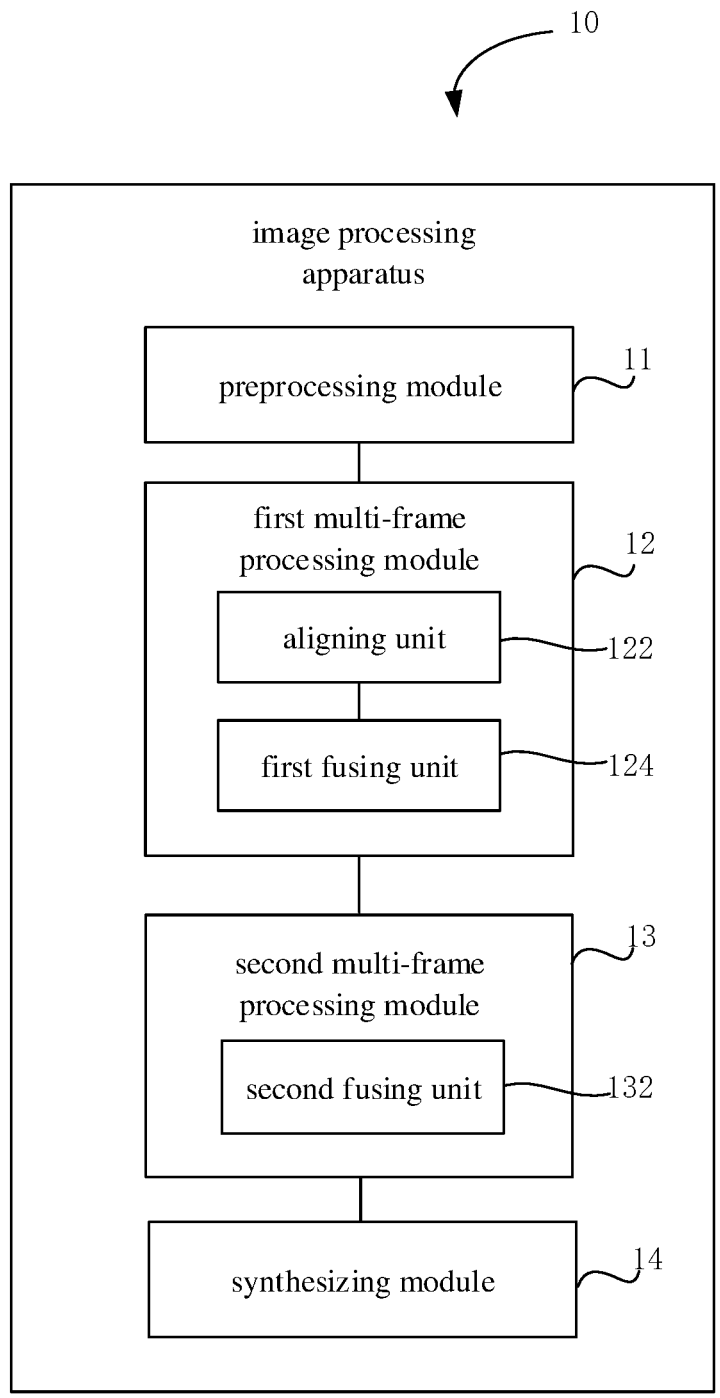
FIG. 2 is a module diagram of an image processing apparatus according to some embodiments of the present disclosure.

In combination with FIG. 2, some embodiments of the present disclosure also provide an image processing apparatus 10 configured to process the aforesaid image processing method. The image processing apparatus 10 includes a preprocessing module 11, a first multi-frame processing module 12, a second multi-frame processing module 13, and a synthesizing module 14.

The block S11 may be realized or implemented by the preprocessing module 11. The block S12 may be realized or implemented by the first multi-frame processing module 12. The block S13 may be realized or implemented by the second multi-frame processing module 13. The block S14 may be realized or implemented by the synthesizing module 14.

In other words, the preprocessing module 11 may be configured to acquire image data of an image sensor based on a preset image reading mode to obtain a plurality of first pixel images and a plurality of second pixel images (that is, the preprocessing module 11 may be configured to obtain a plurality of first pixel images and a plurality of second pixel images by acquiring image data of an image sensor based on a preset image reading mode).

The first multi-frame processing module 12 may be configured to align and fuse the first pixel images to obtain a first processed pixel image, an aligning model, and a fusing parameter (that is, the first multi-frame processing module 12 may be configured to obtain a first processed pixel image, an aligning model, and a fusing parameter by aligning and fusing the first pixel image).

The second multi-frame processing module 13 may be configured to process the second pixel images based on the aligning model and the fusing parameter respectively to obtain a second processed pixel image (that is, the second multi-frame processing module 13 may be configured to obtain a second processed pixel image by processing the second pixel images based on the aligning model and the fusing parameter respectively).

The synthesizing module 14 may be configured to synthesize the first processed pixel image and the second processed pixel image to obtain a target image (that is, the synthesizing module 14 may be configured to obtain a target image by synthesizing the first processed pixel image and the second processed pixel image).

Figure 3:
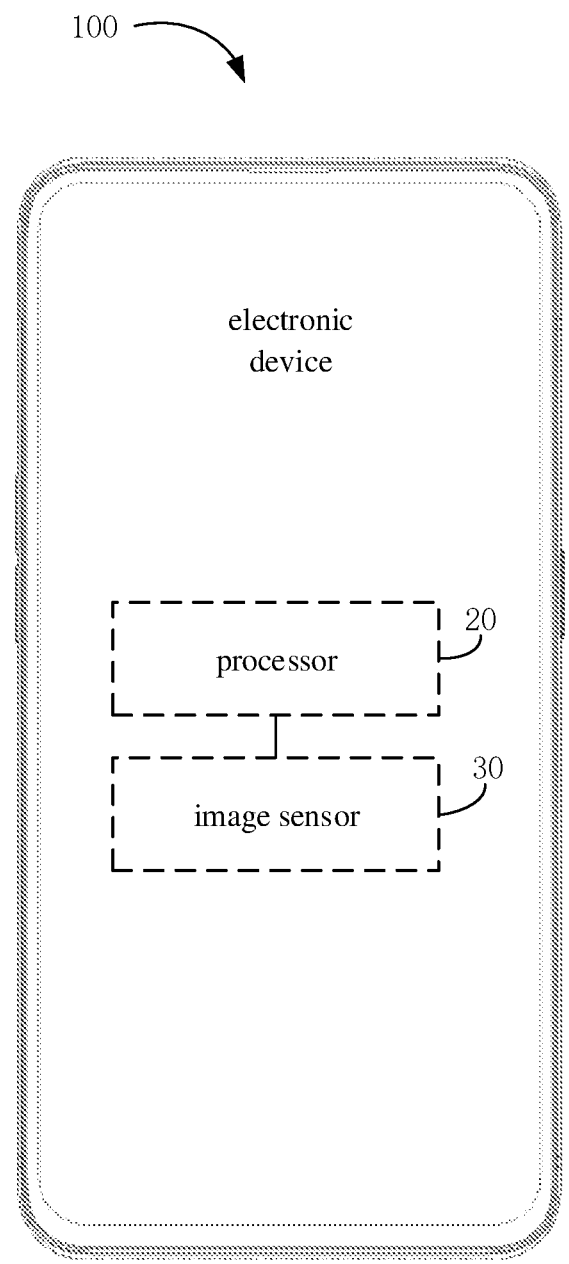
FIG. 3 is a module diagram of an electronic device according to some embodiments of the present disclosure.

In combination with FIG. 3, some embodiments of the present disclosure provide an electronic device 100, and the image processing method of some embodiments of the present disclosure may be implemented and performed by the electronic device 100. The electronic device 100 includes a processor 20 and an image sensor 30.

The processor 20 may be configured to acquire image data of an image sensor based on a preset image reading mode to obtain a plurality of first pixel images and a plurality of second pixel images. The processor 20 may be configured to align and fuse the first pixel images to obtain a first processed pixel image, an aligning model, and a fusing parameter. The processor 20 may also be configured to process the second pixel images based on the aligning model and the fusing parameter respectively to obtain a second processed pixel image and synthesize the first processed pixel image and the second processed pixel image to obtain a target image.

In the image processing method, the image processing apparatus 10, and the electronic device 100 of some embodiments of the present disclosure, the image data is separated into a plurality of first pixel images and a plurality of second pixel images corresponding to or of or to be read from different channels by using the preset image reading mode, and the first pixel images are aligned and fused firstly to obtain the first processed pixel image, the aligning model, and the fusing parameter. Then the second pixel images are aligned based on the aligning model obtained from the first pixel images, and the aligned second pixel images are fused based on the fusing parameter obtained from the first pixel images to obtain the second processed pixel image. In this way, the quality of the first processed pixel image and the second processed pixel image may be synchronized, the possibility of generating artifacts when the first processed pixel image and the second processed pixel image are synthesized into the target image may be reduced, and the image quality may be improved.

The electronic device 100 may be a mobile phone, a tablet, a laptop, an intelligent wearable device (a smart watch, a smart bracelet, a smart helmet, a smart glass, etc.), a virtual reality device, etc.

Some embodiments are illustrated by taking the electronic device 100 as a mobile phone as an example, that is, the image processing method and image processing apparatus 10 may be applied to, but not limited to, a mobile phone. The image processing apparatus 10 may be a hardware or a software preinstalled on the mobile phone and may execute the image processing method when being run or operated on the mobile phone. For example, the image processing apparatus 10 may be an underlying software code section of a mobile phone or a part of an operating system.

The image sensor 30 may be a camera assembly and may use a Complementary Metal Oxide Semiconductor (CMOS) sensor or a Charge-coupled Device (CCD) sensor.

Figure 4:
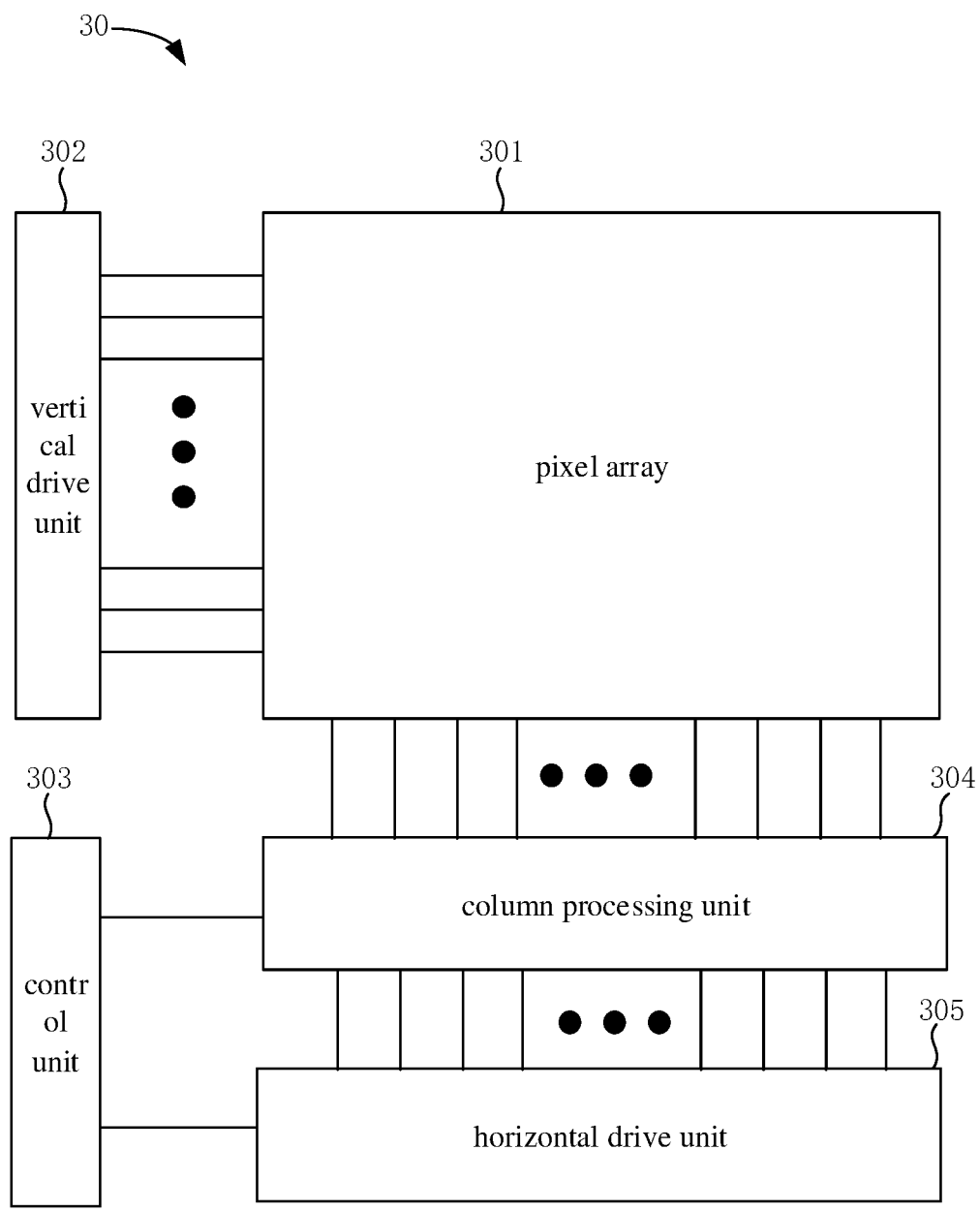
FIG. 4 is a module diagram of an image sensor according to some embodiments of the present disclosure.

As shown in FIG. 4, the image sensor 30 may include a pixel array 301, a vertical drive unit 302, a control unit 303, a column processing unit 304, and a horizontal drive unit 305.

The image sensor 30 may generate image data after the pixel array 301 is exposed. The pixel array 301 may be a Color Filter Array (CFA). The pixel array 301 includes a plurality of photosensitive pixels arranged in a form of a two-dimensional array (i.e., in a form of a two-dimensional matrix). Each photosensitive pixel includes absorption areas with different spectral absorber characteristics. Each photosensitive pixel includes a photoelectric conversion element. Each photosensitive pixel is configured to convert the absorbed light into charges based on the intensity of the light incident thereon, so that each photosensitive pixel may generate a plurality of pieces of pixel data with different color channels, and the image data may be eventually generated.

The vertical drive unit 302 includes a shift register and an address decoder. The vertical drive unit 302 includes a reading scan function and a resetting scan function. The reading scan refers to sequentially scanning the photosensitive pixels row by row and reading signals from the photosensitive pixels row by row. The signals output by each photosensitive pixel in a selected and scanned photosensitive pixel row are transmitted to the column processing unit 304. The resetting scan is configured to reset the charges, photo charges of the photoelectric conversion element are discarded, so that an accumulation of new photo charges may be started. The signal processing executed by the column processing unit 304 is Correlated Double Sampling (CDS) processing. In the CDS processing, a resetting level and a signal level output from each photosensitive pixel in the selected row is taken out or acquired, and the level difference is calculated. Therefore, the signals of the photosensitive pixels in the row are obtained. The column processing unit 304 may have a function of Analog-to-Digital (A/D) conversion configured to convert analog pixel signals into digital formats.

The horizontal drive unit 305 includes a shift register and an address decoder. The horizontal drive unit 305 may be configured to sequentially scan the pixel array 301 column by column. Each column of photosensitive pixels is sequentially processed and sequentially output by the column processing unit 304 through a selection scanning operation executed by the horizontal drive unit 305.

The control unit 303 is configured to configure timing signals based on an operation mode, and control the vertical drive unit 302, the column processing unit 304, and the horizontal drive unit 305 to cooperatively work by using a variety of timing signals.

The processor 20 may be connected to the pixel array 301 of the image sensor 30. After the pixel array 301 is exposed to generate the image data, the image data may be transmitted to the processor 20. The processor 20 may be configured with a preset image reading mode. In the preset image reading mode, the image data generated from the image sensor 30 may be read, and the pixel data of the image data may be separated to obtain a plurality of first pixel images and a plurality of second pixel images of different channels. One first pixel image corresponds to one second pixel image, i.e., the first pixel images and the second pixel images are in one-to-one correspondence, and different first pixel images or different second pixel images have different exposure durations. For example, in some embodiments, the first pixel images include a long-exposure pixel image, a medium-exposure pixel image, and a short-exposure pixel image, and the exposure durations corresponding to the long-exposure pixel image, the medium-exposure pixel image, and the short-exposure pixel image are reduced in sequence.

Each first pixel image or each second pixel image includes a plurality of pixels arranged in an array. For example, in some embodiments of the present disclosure, each first pixel image includes a plurality of R pixels, G pixels, and B pixels arranged in a form of a Bayer array, and each second pixel image includes a plurality of W pixels arranged in an array. That is, each first pixel image includes color information of three color channels R (i.e., red), G (i.e., green), and B (i.e., blue), the second processed pixel image includes panchromatic information, which may also be referred to as brightness information. It may be understood that, in some embodiments, the generated first pixel images and the generated second pixel images are different due to different preset image reading modes.

In some embodiments, after generating the first pixel images and the second pixel images from the image data respectively based on the preset image reading mode, the processor 20 may be configured to align the first pixel images and the second pixel images. After the alignment, the processor 20 may be configured to fuse the first pixel images into a first processed pixel image, and fuse the second pixel images into a second processed pixel image.

It may be understood that, different exposure durations may lead to changes in positions of different pixel images, which results in a pixel deviation after the first pixel images are fused into the first processed pixel image. Therefore, it is necessary to align the first pixel images to reduce a pixel deviation of the first processed pixel image and align the second pixel images to reduce a pixel deviation of the second processed pixel image.

In some embodiments, the processor 20 may firstly align the first pixel images to calculate and establish an aligning model, align the first pixel images and the second pixel images respectively based on the aligning model, then fuse the aligned first pixel images to generate a first processed pixel image and obtain a fusing parameter. In addition, the processor 20 may be configured to fuse the second pixel images based on the fusing parameter generated from the first pixel images to generate a second processed pixel image.

In some embodiments, after generating the first processed pixel image and the second processed pixel image, the processor 20 may be configured to synthesize the first processed pixel image and the second processed pixel image to obtain the target image.

In this way, by aligning the first pixel images and the second pixel images respectively based on the aligning model calculated from the first pixel images, the first processed pixel image and the second processed pixel image generated by fusion may be synchronized, the misplacement between the first processed pixel image and the second processed pixel image may be reduced, and the image quality of the synthesized target image may be improved. Furthermore, since only the aligning model of the first pixel images is needed to be calculated when aligning the first pixel images or the second pixel images, the amount of calculation may be reduced, and the efficiency may be improved. In addition, due to a participation of the fusing parameter generated based on the first pixel images in a fusion process of the aligned second pixel images, a color deviation between the first processed pixel image and the second processed pixel image may be reduced, so as to further improve the image quality of the target image.

Figure 5:
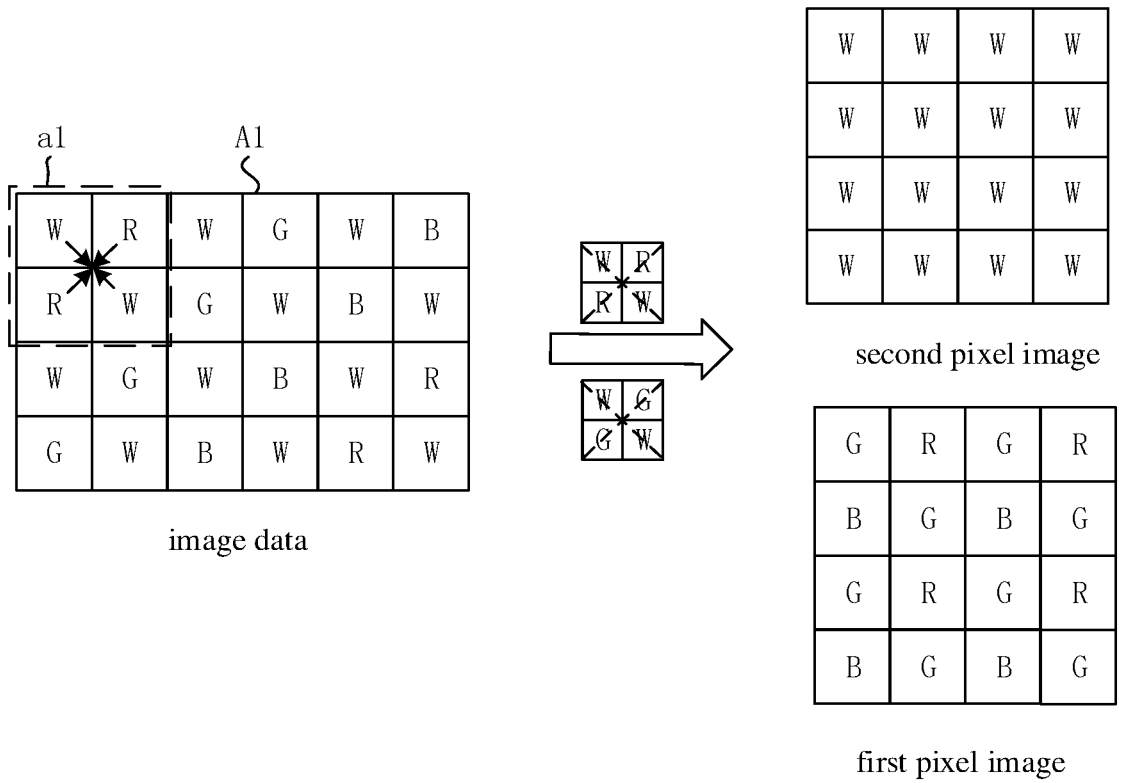
FIG. 5 is a scene diagram of an image processing method according to some embodiments of the present disclosure.
Figure 6:
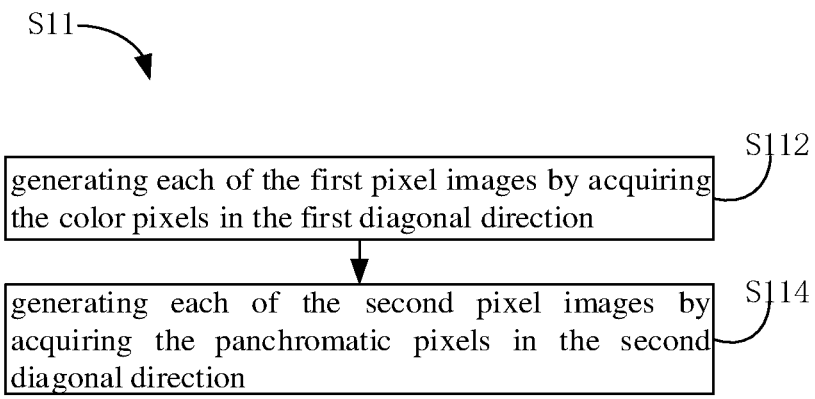
FIG. 6 is a schematic flow chart of an image processing method according to some embodiments of the present disclosure.

As shown in FIGS. 5 and 6, in some embodiments, the image data includes a plurality of minimum repetition units A1. Each minimum repetition unit A1 includes a plurality of pixel units a1. Each pixel unit a1 includes a plurality of color pixels and a plurality of panchromatic pixels. The color pixels are arranged in a first diagonal direction. The panchromatic pixels are arranged in a second diagonal direction. The first diagonal direction is different from the second diagonal direction. The block S11 includes the following sub-blocks.

S112, the method includes acquiring the color pixels in the first diagonal direction to generate each of the first pixel images (that is, the method includes generating each of the first pixel images by acquiring the color pixels in the first diagonal direction).

S114, the method includes acquiring the panchromatic pixels in the second diagonal direction to generate each of the second pixel images (that is, the method includes generating each of the second pixel images by acquiring the panchromatic pixels in the second diagonal direction).

As shown in FIG. 2, in some embodiments, the sub-block S112 and the sub-block S114 may be realized by the preprocessing module 11.

In other words, the preprocessing module 11 may be configured to acquire the color pixels in the first diagonal direction to generate the first pixel image. The preprocessing module 11 may also be configured to acquire the panchromatic pixels in the second diagonal direction to generate the second pixel image.

In some embodiments, the processor 20 may be configured to acquire the color pixels in the first diagonal direction to generate the first pixel image. The processor 20 may also be configured to acquire the panchromatic pixels in the second diagonal direction to generate the second pixel image.

In some embodiments, when the processor 20 reads the image data collected by the image sensor 30 through the preset image reading mode, the preset image reading mode may be a Binning mode. That is, the processor 20 may read the image data by using the Binning mode to generate the first pixel images and the second pixel images. It should be noted that, the Binning algorithm adds corresponding charges of adjacent pixels of the same color within the same pixel unit a1 and reads in a mode of a single pixel.

In some embodiments, when the processor 20 reads in the Binning mode, the color pixels in the first diagonal direction of each pixel unit a1 are read, the panchromatic pixels in the second diagonal direction of each pixel unit a1 are read. All the read color pixels are arranged in an array to form the first pixel image, and all the read panchromatic pixels are arranged in an array to generate the second pixel image.

Figure 7:
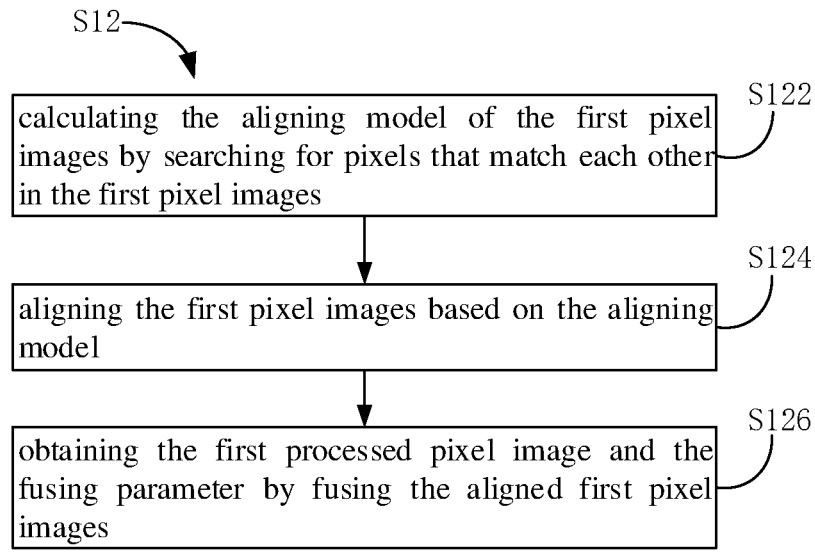
FIG. 7 is a schematic flow chart of an image processing method according to some embodiments of the present disclosure.

As shown in FIG. 7, in some embodiments, the block S12 includes the following sub-blocks.

S122, the method includes searching for pixels that match each other in the first pixel images to calculate the aligning model of the first pixel images (that is, the method includes calculating the aligning model of the first pixel images by searching for pixels that match each other in the first pixel images).

S124, the method includes aligning the first pixel images based on the aligning model.

S126, the method includes fusing the aligned first pixel images to obtain the first processed pixel image (that is, the method includes obtaining the first processed pixel image and the fusing parameter by fusing the aligned first pixel images).

In some embodiments, the first multi-frame processing module 12 includes an aligning unit 122 and a first fusing unit 124. The blocks S122 and S124 may be realized by the aligning unit 122, and the block S126 may be realized by the first fusing unit 124.

In other words, the aligning unit 122 may be configured to search for pixels that match each other in the first pixel images, to calculate the aligning model of the first pixel images. The aligning unit 122 may also be configured to align the first pixel images based on the aligning model.

The first fusing unit 124 may be configured to fuse the aligned first pixel images to obtain the first processed pixel image.

In some embodiments, the processor 20 may be configured to search for pixels that match each other in the first pixel images to calculate the aligning model of the first pixel images. The processor 20 may also be configured to align the first pixel images based on the aligning model and fuse the aligned first pixel images to obtain the first processed pixel image.

It should be noted that, since a motion relationship between the pixels the match each other reflects a motion relationship between the images, the aligning model calculated based on the pixels that match each other may eliminate a motion relationship between the images, in this way, the first pixel images may be fused together with a high quality.

The processor 20 may use a Scale-Invariant Feature Transform (SIFT), a Speeded Up Robust Features (SURF) feature point matching algorithm, or an optical flow field algorithm to search for the pixels that match each other in the first pixel images.

Those skilled in the relevant computing art may understand that, the SIFT algorithm refers to an algorithm that detects and describes local features in an image in the field of computer vision. The SIFT algorithm is invariant to a rotation, a scale scaling, and a brightness change, and is stable to a perspective change, an affine transformation, and noise in a certain degree. The SIFT feature detection has four operations. 1, extreme value detection in a scale space is performed, in which all images in the scale space are searched, and potential points of interest that are invariant to scale and selection are identified through a Gaussian differential function. 2, feature point are positioned, in which a position scale is determined by using a fitting fine model at each candidate position, and key points are selected based on a degree of stability. 3, feature direction assignment is performed, in which one or more directions are assigned to each key point position based on a local gradient direction of the image, all subsequent operations serve to transform a direction, a scale, and a position of the key point, so as to provide the invariance of these features. 4, feature point are described, in which local gradients of the image are measured at a selected scale within a neighborhood around each feature point, the gradients are transformed into a representation that allows a significant deformation of a local shape and an illumination change.

The SURF algorithm is a robust image recognition and description algorithm, which may be used for computer vision tasks. The concept and operation of the SURF algorithm are based on the SIFT, but the detailed processes are slightly different. The SURF algorithm includes the following three operations: feature point detection, feature proximity description, and descriptor pairing.

The optical flow field algorithm is a point-based matching algorithm, which uses changes of pixels in an image sequence in the time domain and a correlation between adjacent frames to find a corresponding relationship between a previous frame and a current frame, so as to calculate motion information of an object between adjacent frames.

In some embodiments, the aligning model that may be selected may be an affine transformation model or a perspective transformation model. That is, the affine transformation model or the perspective transformation model may be calculated based on the pixels that match each other, and then the first pixel images may be aligned based on the affine transformation model or the perspective transformation model to obtain the aligned first pixel images.

Figure 8:
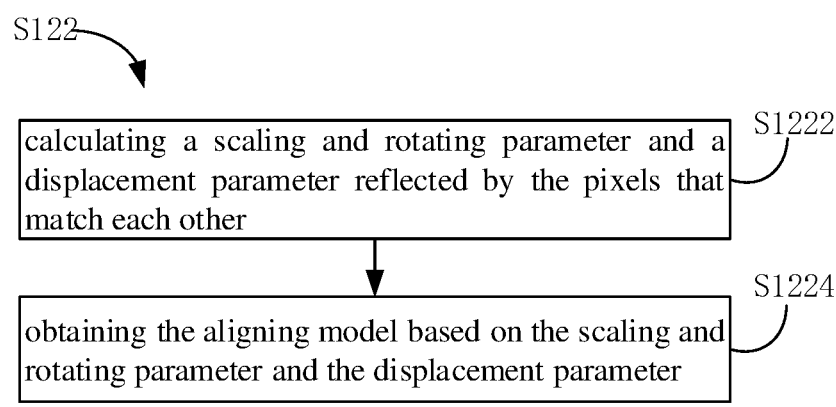
FIG. 8 is a schematic flow chart of an image processing method according to some embodiments of the present disclosure.

As shown in FIG. 8, in some embodiments, the block S122 includes the following sub-blocks.

S1222, the method includes calculating a scaling and rotating parameter and a displacement parameter reflected by the pixels that match each other.

S1224, the method includes establishing the aligning model based on the scaling and rotating parameter and the displacement parameter.

In some embodiments, the sub-block S1222 and the sub-block S1224 may be realized by the aligning unit 122. That is, the aligning unit 122 may be configured to calculate the scaling and rotating parameter and the displacement parameter reflected by the pixels that match each other, and the aligning unit 122 may also be configured to establish the aligning model based on the scaling and rotating parameter and the displacement parameter.

In some embodiments, the processor 20 is configured to calculate the scaling and rotating parameter and the displacement parameter reflected by the pixels that match each other and establish the aligning model based on the scaling and rotating parameter and the displacement parameter.

In some embodiments, the transformation model may be an affine transformation model. In the affine transformation model, any parallelogram in a plane may be mapped to another parallelogram by an affine transformation, image mapping operations are carried out in the same space plane, and different types of parallelograms may be obtained by using different transformation parameters which are reduced. When an affine transformation matrix model is used, the scalation and rotation of the image are controlled based on the scaling and rotating parameter, and the displacement of the image is controlled based on the displacement parameter.

In some embodiments, coordinate values of pixels of a first one of the first pixel images are acquired and substituted into a preset affine transformation formula and coordinate values of pixels of a second one of the first pixel images are substituted into the preset affine transformation formula to calculate the scaling and rotating parameter and the displacement parameter. Then the affine transformation model may be established based on the scaling and rotating parameter and the displacement parameter. In this way, the images may be aligned without relying on a fixed mount and other devices, and a pixel deviation after the images are synthesized may be reduced.

Figure 9:
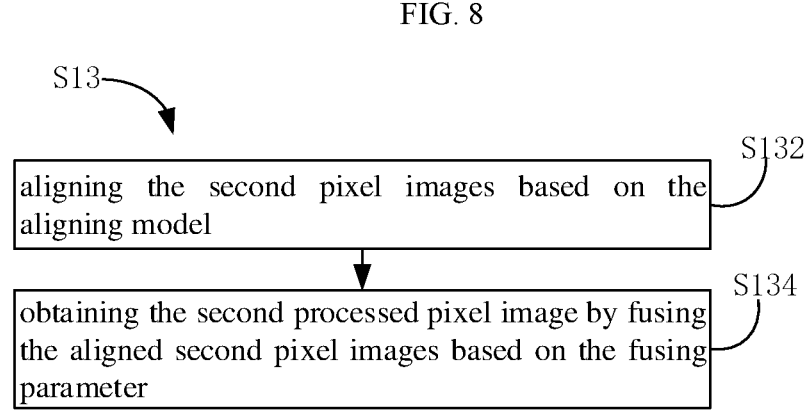
FIG. 9 is a schematic flow chart of an image processing method according to some embodiments of the present disclosure.

As shown in FIG. 9, in some embodiments, the block S13 includes the following blocks.

S132, the method includes aligning the second pixel images based on the aligning model.

S134, the method includes fusing the aligned second pixel images based on the fusing parameter to obtain the second processed pixel image (that is, the method includes obtaining the second processed pixel image by fusing the aligned second pixel images based on the fusing parameter).

In some embodiments, the second multi-frame processing module 13 may include a second fusing unit 132. The sub-block S132 may be realized by the aligning unit 122, and the sub-block S134 may be realized by the second fusing unit 132. In other words, the aligning unit 122 may also be configured to align the second pixel images based on the aligning model. The second fusing unit 132 is configured to fuse the aligned second pixel images based on the fusing parameter to obtain the second processed pixel image.

In some embodiments, the processor 20 may be configured to align the second pixel images based on the aligning model and fuse the aligned second pixel images based on the fusing parameter to obtain the second processed pixel image.

In this way, the second pixel images are aligned by using the aligning model, a pixel deviation of the second processed pixel image generated by fusion may be reduced, and the second processed pixel image and the first processed pixel image may be aligned synchronously. The second processed pixel image is generated by fusing the aligned second pixel images based on the fusing parameter, and a color deviation between the second processed pixel image and the first processed pixel image may be reduced.

Figure 10:
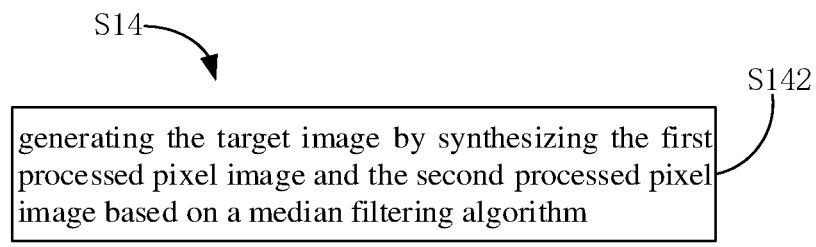
FIG. 10 is a schematic flow chart of an image processing method according to some embodiments of the present disclosure.

As shown in FIG. 10, in some embodiments, the block S14 includes the following blocks.

S142, the method includes synthesizing the first processed pixel image and the second processed pixel image based on a median filtering algorithm to generate the target image (that is, the method includes generating the target image by synthesizing the first processed pixel image and the second processed pixel image based on a median filtering algorithm).

In some mode, the block S142 may be realized by the synthesizing module 14. In other words, the synthesizing module 14 may be configured to synthesize the first processed pixel image and the second processed pixel image based on the median filtering algorithm to generate the target image.

In some embodiments, the processor 20 may be configured to synthesize the first processed pixel image and the second processed pixel image based on the median filtering algorithm to generate the target image.

In some embodiments, when synthesizing, the processor 20 may firstly perform median filtering on the first processed pixel image and the second processed pixel image, and then synthesize the first processed pixel image that is median filtered and the second processed pixel image that is median filtered. In some embodiments, the processor 20 may firstly synthesize the first processed pixel image and the second processed pixel image into a new image, and then perform median filtering on the image to generate a final image. In this way, the flexibility of median filtering is high, and the signal-to-noise ratio of the image that is median filtered may be significantly improved.

It should be noted that, median filtering is a non-linear signal processing technique which is based on a sorting statistical theory and can effectively suppress noise. The basic principle of the median filtering is to replace a value of a point in a digital image or a digital image sequence with the median of points in a neighborhood thereof, such that values of surrounding pixels are close to the true value, thereby eliminating isolated noise points.

Figure 11:
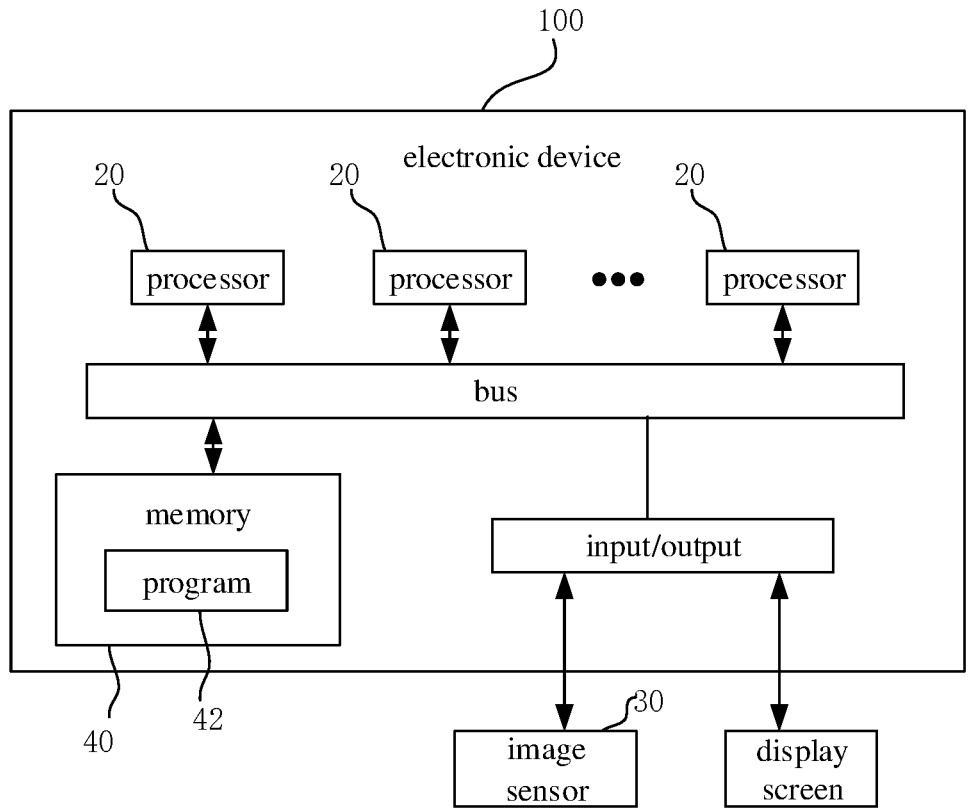
FIG. 11 is a module diagram of an electronic device according to some embodiments of the present disclosure.

As shown in FIG. 11, some embodiments of the present disclosure provide an electronic device 100, which includes a processor 20, a memory 30, and one or more programs 32. The one or more programs 32 are stored in the memory 30 and executed by the processor 20. The one or more programs 32 includes instructions that are configured to execute the aforementioned image processing method when executed by the processor 20.

Figure 12:
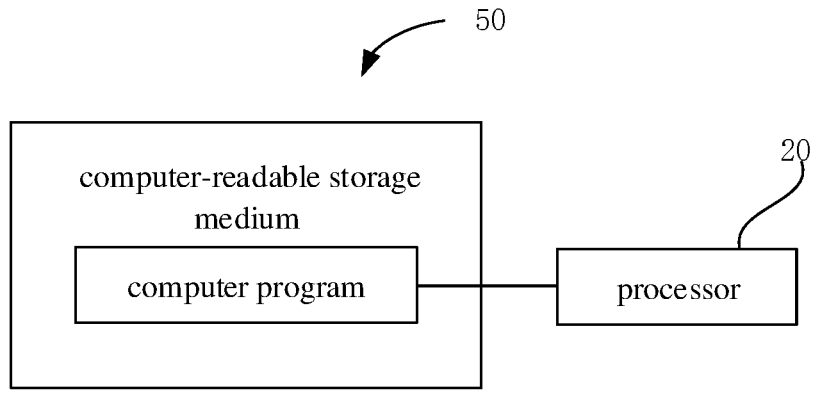
FIG. 12 is a diagram illustrating a connection between a processor and a computer-readable storage medium according to some embodiments of the present disclosure.

In combination with FIG. 12, some embodiments of the present disclosure provide a non-transitory computer-readable storage medium 40, which includes a computer program. When executed by one or more processors 20, the computer program enables the one or more processors 20 to execute the aforementioned image processing method.

In the description of the specification, the description with reference to the terms "an embodiment", "some embodiments", "exemplary embodiments", "examples", "specific examples" or "some examples" etc., means that the specific features, structures, materials, or characteristics described in connection with said embodiment or example are included in at least one embodiment or example of the present disclosure. In the specification, the schematic representation of the aforementioned terms does not necessarily refer to the same embodiment or example. Moreover, the specific features, structures, materials, or characteristics described may be combined in a suitable manner in any one or more embodiments or examples. In addition, without contradicting each other, those skilled in the art may combine the different embodiments or examples described in the specification and the features of the different embodiments or examples.

Any process or method description in the flowchart or otherwise described herein may be understood to represent a module, fragment, or a portion of code including one or more executable instructions for implementing operations of a particular logical function or process, and the scope of the preferred embodiments of the present disclosure includes additional implementations in which the functions may be performed not in the order shown or discussed, including in a substantially simultaneous manner or in the reverse order, depending on the function involved, as should be understood by those skilled in the art to which the embodiments of the present disclosure belong.

Although the embodiments of the present disclosure have been shown and described above, it may be understood that the aforementioned embodiments are exemplary and should not be construed as limitations on the present disclosure. Variations, modifications, replacements, and variants of the aforementioned embodiments may be made by those skilled in the art within the scope of the present disclosure.

The above embodiments illustrate merely some embodiments of the present disclosure, which are described in details but are not construed to limit the scope of the present disclosure. It should be pointed out that, for those skilled in the art, without departing from the principle of the present disclosure, various changes and improvements may be made, which are covered by the protection scope of the present disclosure. Therefore, the protection scope of the present disclosure is according to the appended claims.

What is claimed is:

1. An image processing method, comprising:
   obtaining a plurality of first pixel images and a plurality of second pixel images by acquiring image data of an image sensor based on a preset image reading mode;
   obtaining a first processed pixel image, an aligning model, and a fusing parameter by aligning and fusing the first pixel images;
   obtaining a second processed pixel image by processing the second pixel images based on the aligning model and the fusing parameter respectively; and
   obtaining a target image by synthesizing the first processed pixel image and the second processed pixel image.

2. The image processing method according to claim 1, wherein the obtaining a first processed pixel image, an aligning model, and a fusing parameter by aligning and fusing the first pixel images comprises:
   calculating the aligning model of the first pixel images by searching for pixels that match each other in the first pixel images;
   aligning the first pixel images based on the aligning model; and
   obtaining the first processed pixel image and the fusing parameter by fusing the aligned first pixel images.

3. The image processing method according to claim 2, wherein the calculating the aligning model of the first pixel images by searching for pixels that match each other in the first pixel images comprises:
   calculating a scaling and rotating parameter and a displacement parameter reflected by the pixels that match each other; and
   obtaining the aligning model based on the scaling and rotating parameter and the displacement parameter.

4. The image processing method according to claim 1, wherein the obtaining a second processed pixel image by processing the second pixel images based on the aligning model and the fusing parameter respectively comprises:
   aligning the second pixel images based on the aligning model; and
   obtaining the second processed pixel image by fusing the aligned second pixel images based on the fusing parameter.

5. The image processing method according to claim 1, wherein the image data comprises a plurality of minimum repetition units, each of the minimum repetition units comprises a plurality of pixel units, each of the pixel units comprises a plurality of color pixels and a plurality of panchromatic pixels, the color pixels are arranged in a first diagonal direction, the panchromatic pixels are arranged in a second diagonal direction, the first diagonal direction is different from the second diagonal direction, and the obtaining a plurality of first pixel images and a plurality of second pixel images by acquiring image data of an image sensor based on a preset image reading mode comprises:
   generating each of the first pixel images by acquiring the color pixels in the first diagonal direction; and
   generating each of the second pixel images by acquiring the panchromatic pixels in the second diagonal direction.

6. The image processing method according to claim 1, wherein the obtaining a target image by synthesizing the first processed pixel image and the second processed pixel image comprises:
   generating the target image by synthesizing the first processed pixel image and the second processed pixel image based on a median filtering algorithm.

7. The image processing method according to claim 1, wherein each of the first pixel images comprises R pixels, G pixels, and B pixels arranged in a form of a Bayer array, and each of the second pixel images comprises W pixels arranged in an array.

8. The image processing method according to claim 1, wherein the first pixel images and the second pixel images are in one-to-one correspondence, the first pixel images have exposure durations different from each other, and the second pixel images have exposure durations different from each other.

9. An electronic device, comprising an image sensor, a processor, a memory, and one or more programs, wherein the one or more programs are stored in the memory and executed by the processor, and the one or more programs comprises instructions that are configured to execute the image processing method comprising:
   obtaining a plurality of first pixel images and a plurality of second pixel images by acquiring image data of an image sensor based on a preset image reading mode;
   obtaining a first processed pixel image, an aligning model, and a fusing parameter by aligning and fusing the first pixel images;
   obtaining a second processed pixel image by processing the second pixel images based on the aligning model and the fusing parameter respectively; and
   obtaining a target image by synthesizing the first processed pixel image and the second processed pixel image.

10. The electronic device according to claim 9, wherein the obtaining a first processed pixel image, an aligning model, and a fusing parameter by aligning and fusing the first pixel images comprises:
   calculating the aligning model of the first pixel images by searching for pixels that match each other in the first pixel images;
   aligning the first pixel images based on the aligning model; and
   obtaining the first processed pixel image and the fusing parameter by fusing the aligned first pixel images.

11. The electronic device according to claim 10, wherein the calculating the aligning model of the first pixel images by searching for pixels that match each other in the first pixel images comprises:
   calculating a scaling and rotating parameter and a displacement parameter reflected by the pixels that match each other; and
   obtaining the aligning model based on the scaling and rotating parameter and the displacement parameter.

12. The electronic device according to claim 9, wherein the obtaining a second processed pixel image by processing the second pixel images based on the aligning model and the fusing parameter respectively comprises:
   aligning the second pixel images based on the aligning model; and
   obtaining the second processed pixel image by fusing the aligned second pixel images based on the fusing parameter.

13. The electronic device according to claim 9, wherein the image data comprises a plurality of minimum repetition units, each of the minimum repetition units comprises a plurality of pixel units, each of the pixel units comprises a plurality of color pixels and a plurality of panchromatic pixels, the color pixels are arranged in a first diagonal direction, the panchromatic pixels are arranged in a second diagonal direction, the first diagonal direction is different from the second diagonal direction, and the obtaining a plurality of first pixel images and a plurality of second pixel images by acquiring image data of an image sensor based on a preset image reading mode comprises:
   generating each of the first pixel images by acquiring the color pixels in the first diagonal direction; and
   generating each of the second pixel images by acquiring the panchromatic pixels in the second diagonal direction.

14. The electronic device according to claim 9, wherein the obtaining a target image by synthesizing the first processed pixel image and the second processed pixel image comprises:
   generating the target image by synthesizing the first processed pixel image and the second processed pixel image based on a median filtering algorithm.

15. The electronic device according to claim 9, wherein each of the first pixel images comprises R pixels, G pixels, and B pixels arranged in a form of a Bayer array, and each of the second pixel images comprises W pixels arranged in an array.

16. A non-transitory computer-readable storage medium, comprising a computer program, wherein in response to being executed by one or more processors, the computer program enables the one or more processors to execute the image processing method comprising:
   obtaining a plurality of first pixel images and a plurality of second pixel images by acquiring image data of an image sensor based on a preset image reading mode;
   obtaining a first processed pixel image, an aligning model, and a fusing parameter by aligning and fusing the first pixel images;
   obtaining a second processed pixel image by processing the second pixel images based on the aligning model and the fusing parameter respectively; and
   obtaining a target image by synthesizing the first processed pixel image and the second processed pixel image.

17. The storage medium according to claim 16, wherein the obtaining a first processed pixel image, an aligning model, and a fusing parameter by aligning and fusing the first pixel images comprises:
   calculating the aligning model of the first pixel images by searching for pixels that match each other in the first pixel images;
   aligning the first pixel images based on the aligning model; and
   obtaining the first processed pixel image and the fusing parameter by fusing the aligned first pixel images.

18. The storage medium according to claim 17, wherein the calculating the aligning model of the first pixel images by searching for pixels that match each other in the first pixel images comprises:
   calculating a scaling and rotating parameter and a displacement parameter reflected by the pixels that match each other; and
   obtaining the aligning model based on the scaling and rotating parameter and the displacement parameter.

19. The storage medium according to claim 16, wherein the obtaining a second processed pixel image by processing the second pixel images based on the aligning model and the fusing parameter respectively comprises:
   aligning the second pixel images based on the aligning model; and
   obtaining the second processed pixel image by fusing the aligned second pixel images based on the fusing parameter.

20. The storage medium according to claim 16, wherein the image data comprises a plurality of minimum repetition units, each of the minimum repetition units comprises a plurality of pixel units, each of the pixel units comprises a plurality of color pixels and a plurality of panchromatic pixels, the color pixels are arranged in a first diagonal direction, the panchromatic pixels are arranged in a second diagonal direction, the first diagonal direction is different from the second diagonal direction, and the obtaining a plurality of first pixel images and a plurality of second pixel images by acquiring image data of an image sensor based on a preset image reading mode comprises:

generating each of the first pixel images by acquiring the color pixels in the first diagonal direction; and generating each of the second pixel images by acquiring the panchromatic pixels in the second diagonal direction.

* * * * *